No. 858,053. PATENTED JUNE 25, 1907.
F. R. BARNHEISEL.
ROTARY BAKING OVEN.
APPLICATION FILED OCT. 17, 1905.
6 SHEETS—SHEET 1.
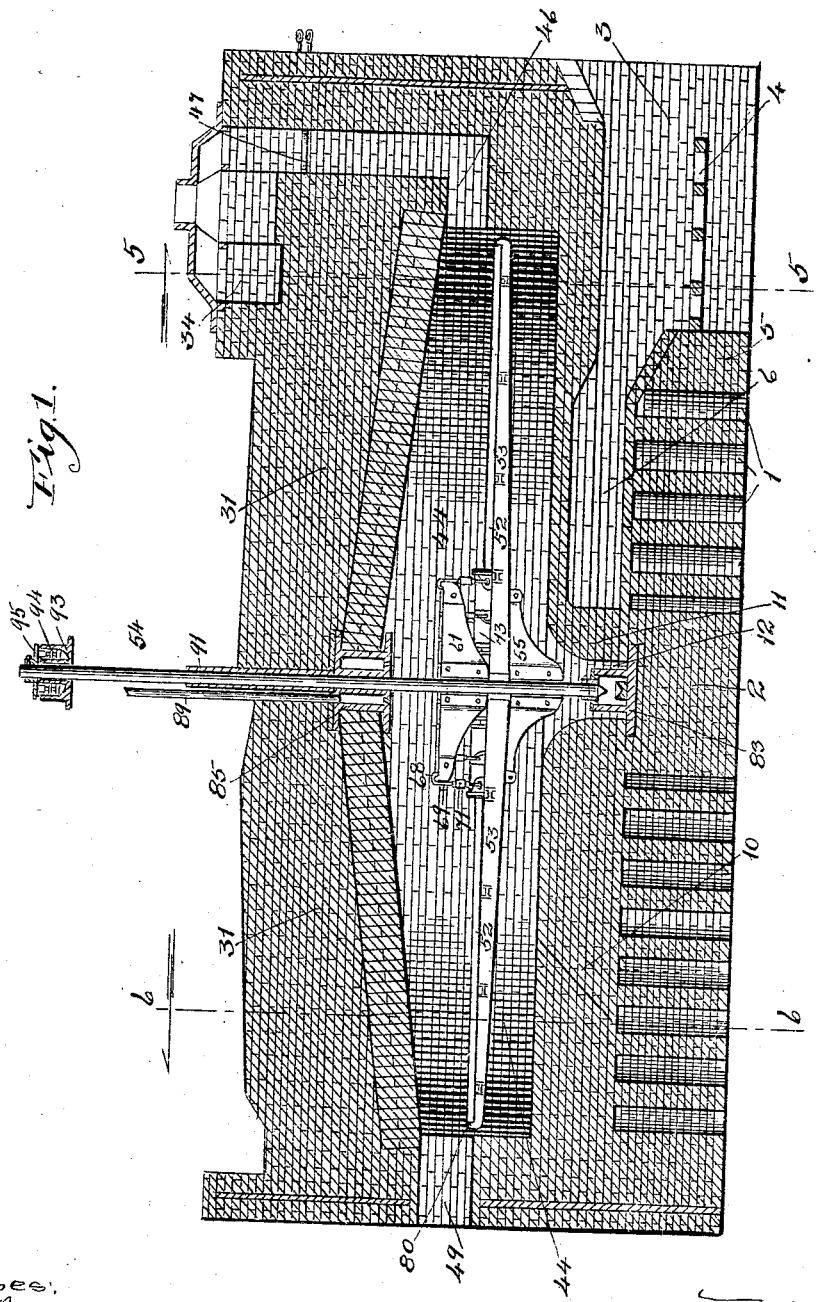

No. 858,053. PATENTED JUNE 25, 1907.
F. R. BARNHEISEL.
ROTARY BAKING OVEN.
APPLICATION FILED OCT. 17, 1905.
6 SHEETS—SHEET 2.
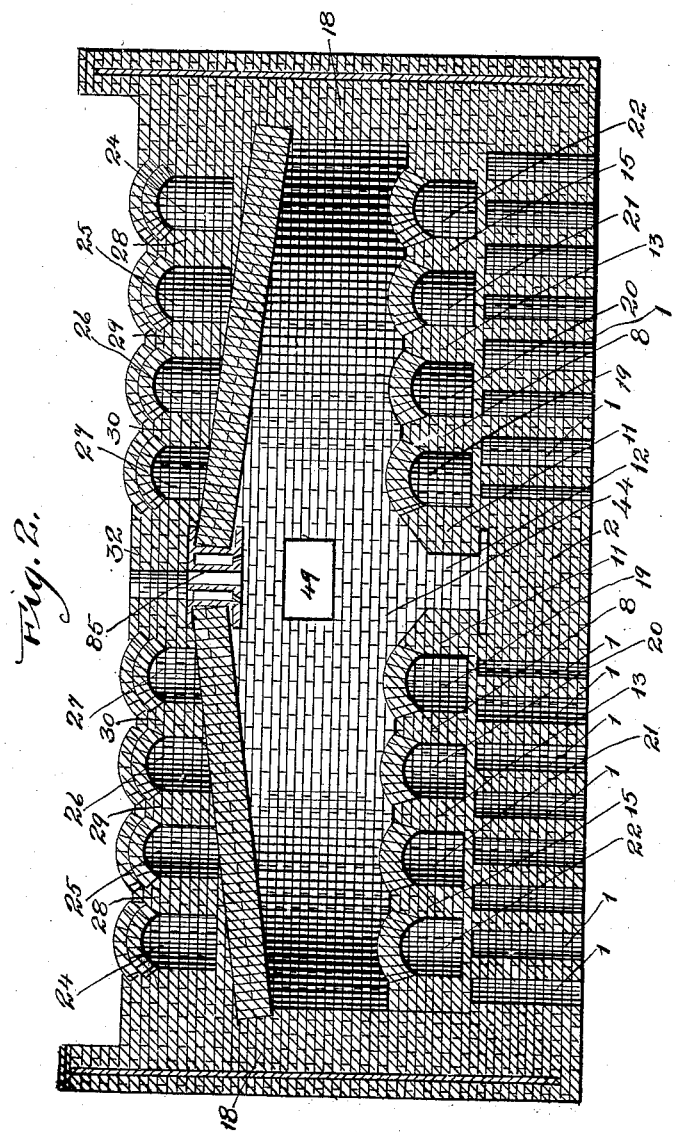

No. 858,053. PATENTED JUNE 25, 1907.
F. R. BARNHEISEL.
ROTARY BAKING OVEN.
APPLICATION FILED OCT. 17, 1905.
6 SHEETS—SHEET 3.
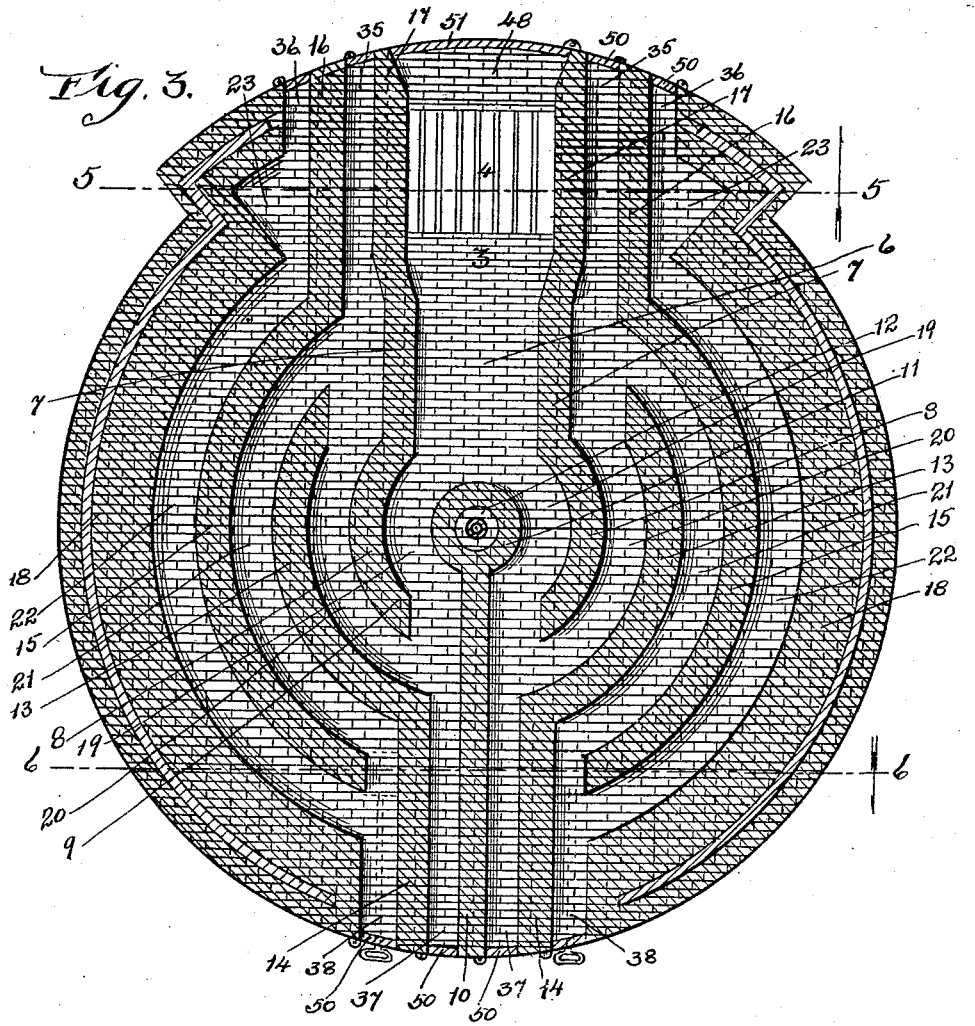
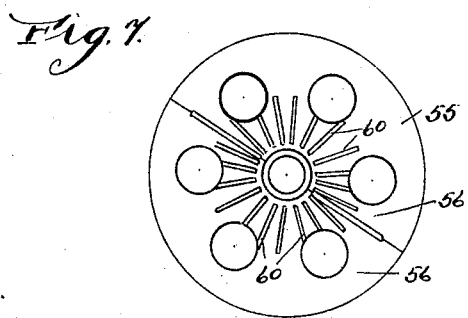

No. 858,053. PATENTED JUNE 25, 1907.
F. R. BARNHEISEL.
ROTARY BAKING OVEN.
APPLICATION FILED OCT. 17, 1905.
6 SHEETS—SHEET 4.
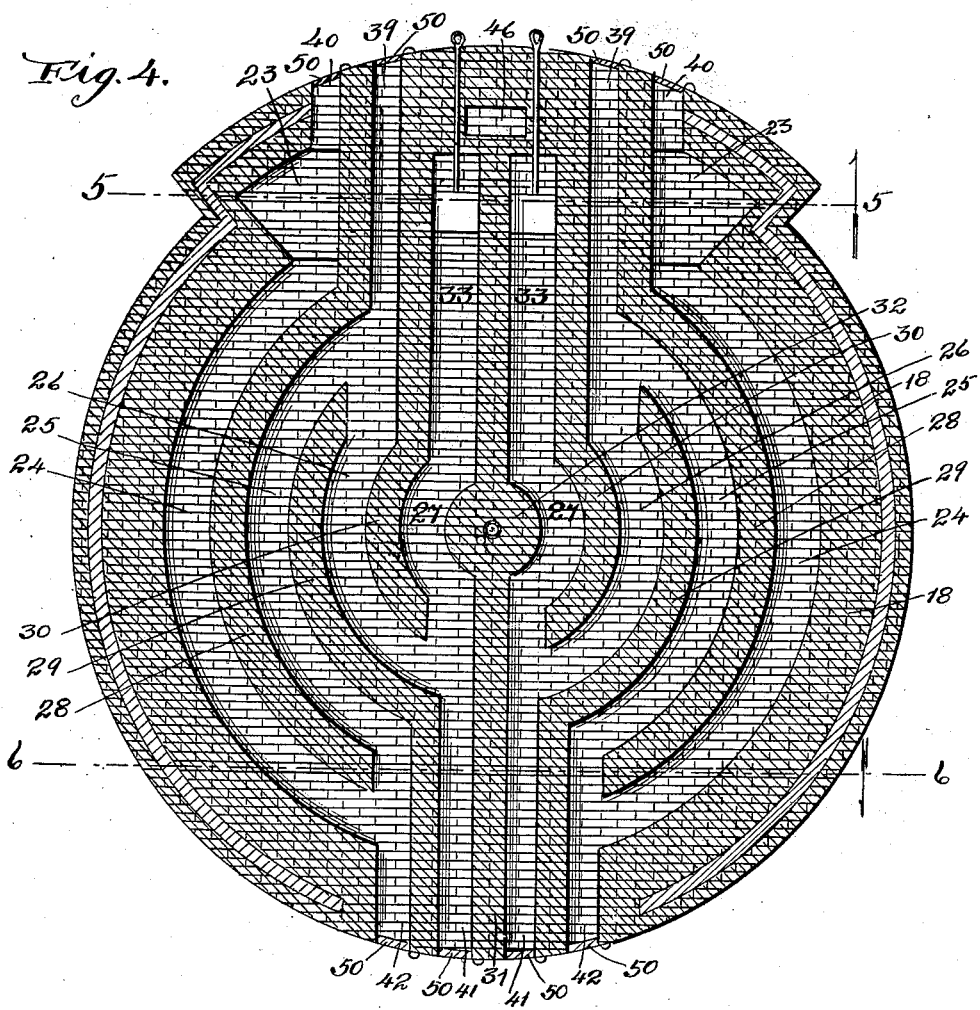
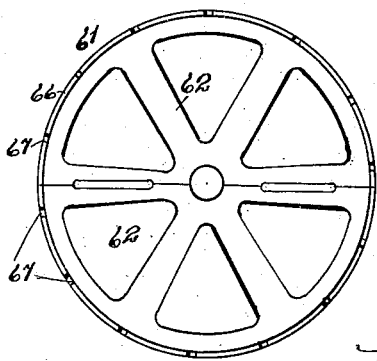

No. 858,053. PATENTED JUNE 25, 1907.
F. R. BARNHEISEL.
ROTARY BAKING OVEN.
APPLICATION FILED OCT. 17, 1905.
6 SHEETS—SHEET 5.
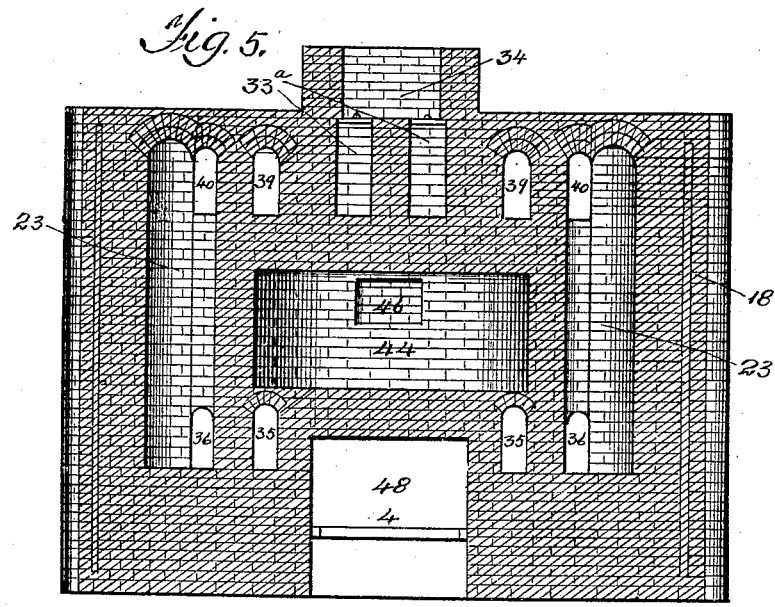
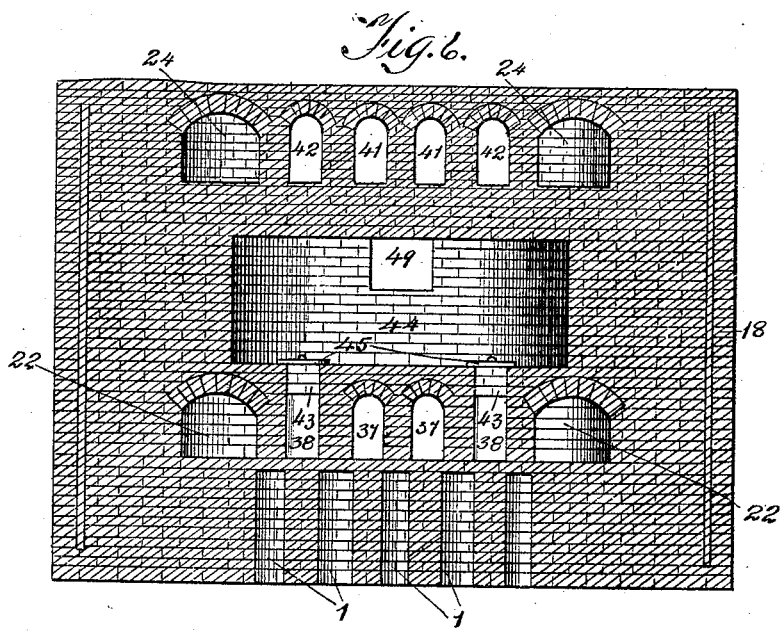

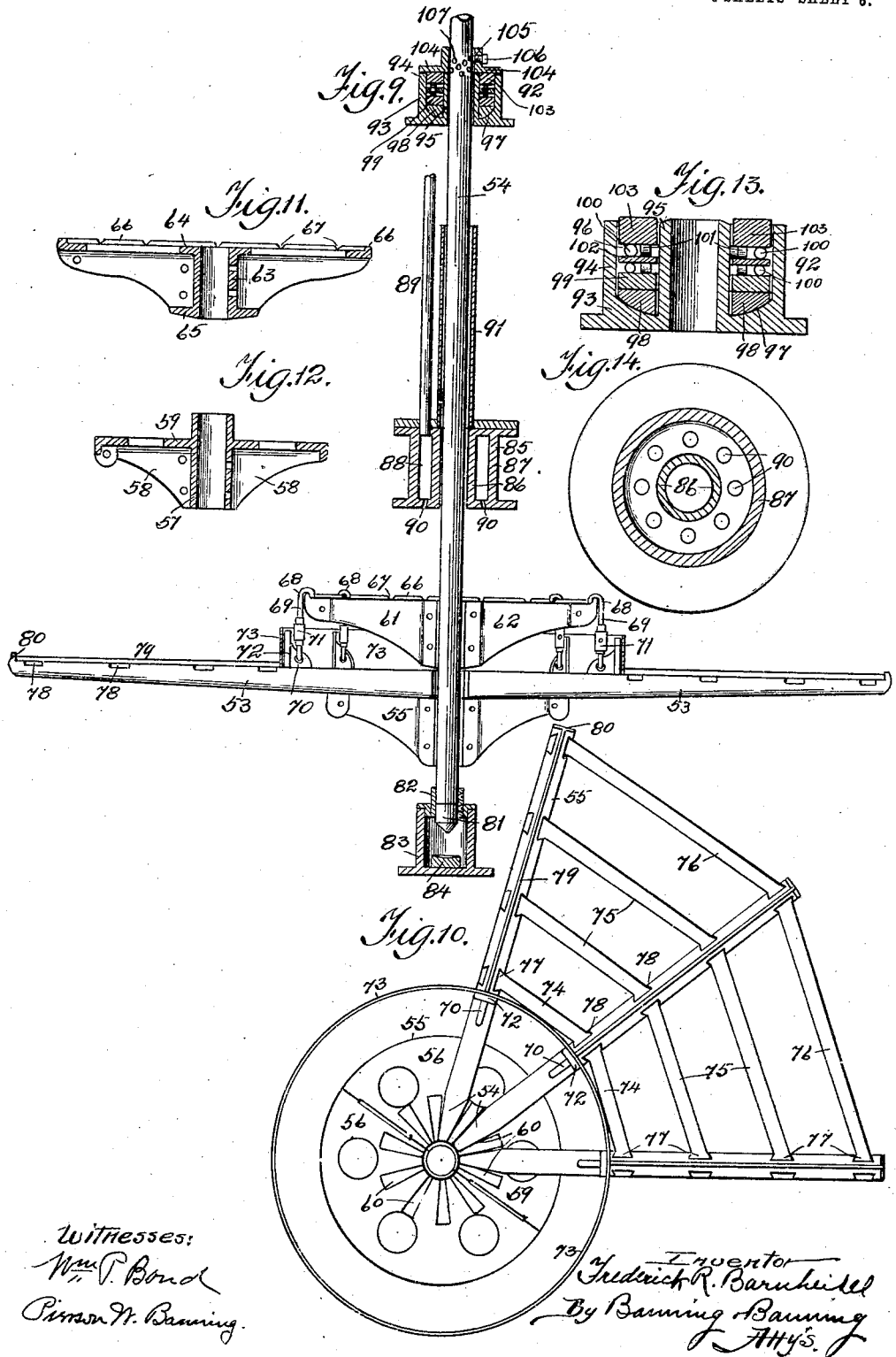

UNITED STATES PATENT OFFICE.

FREDERICK R. BARNHEISEL, OF CHICAGO, ILLINOIS.

ROTARY BAKING-OVEN.

No. 858,053.  Specification of Letters Patent.  Patented June 25, 1907.

Application filed October 17, 1905. Serial No. 283,121.

*To all whom it may concern:*

Be it known that I, FREDERICK R. BARNHEISEL, a citizen of the United States, residing at Chicago, in the county of Cook and State of Illinois, have invented certain new and useful Improvements in Rotary Baking-Ovens, of which the following is a specification.

This invention relates to that class of baking ovens employing a rotary baking plane, and has for its objects to improve the construction and arrangement of the supporting arms for the baking plane to provide for adjustment in case of warping due to heat or other cause.

The invention further relates to the method of mounting the arms upon the rotary shaft and to the bearings for allowing easy rotation thereof.

Another object of the invention is to improve the construction and arrangement of flues above and below the baking chamber for the purpose of uniformly heating the chamber; and the invention also relates to the method of connecting the flues and to an arrangement of dampers by which the heated air can be either sent through the baking chamber directly or through the flues around the chamber for regulating the amount of heat and its distribution.

The invention further has for its object to improve the construction and arrangement of the oven as a whole and of the individual parts thereof so that the operation of the oven may be regulated to meet the requirements of each individual case and the rotary plane actuated from a point outside of the oven by the expenditure of a small amount of power.

The invention consists in the features of construction and combinations of parts hereinafter described and claimed.

In the drawings Figure 1 is a sectional view of the oven from front to rear; Fig. 2 a section taken at right angles to the section of Fig. 1 with the baking plane or turn table omitted; Fig. 3 a sectional plan view of the lower flues taken on a central horizontal line through the flues; Fig. 4 a sectional plan view of the upper flues taken on a central horizontal line through the flues; Fig. 5 a section taken on lines 5—5 of Figs. 1, 3 and 4; Fig. 6 a section taken on lines 6—6 of Figs. 1, 3 and 4; Fig. 7 a plan view of the lower hub for the arms of the baking plane; Fig. 8 a plan view of the supporting spider for the arms; Fig. 9 a sectional view of the entire rotating mechanism; Fig. 10 a plan view showing the method of securing the radiating arms for the baking plane; Fig. 11 a sectional view of the supporting spider Fig. 12 a sectional view of the supporting hub; Fig. 13 an enlarged sectional view of the ball bearing mechanism; and Fig. 14 a cross sectional view of the crown bearing.

The oven is constructed of brick, is substantially cylindrical in shape and is provided in its bottom with a series of air spaces 1 best shown in Fig. 1, which air spaces surround a solid central foundation 2 which supports the baking plane, and above the air spaces are arranged a series of lower flues best shown in Fig. 3. The lower flues communicate with a fire chamber 3 having located therein a grate 4 behind which is a transversely extending bridge wall 5, and the fire box communicates with a central flue chamber 6 having straight parallel side walls 7 which terminate in curved inner flue walls 8 whose terminal ends 9 are separated from one another by a central partition wall 10 which terminates at its inner end in a central circular wall 11 in the middle of which is a circular recess 12 which forms a well for the step of the rotary shaft which carries the baking plane. Surrounding the inner flue walls 8 are curved intermediate flue walls 13 connected at their outer ends with straight partition walls 14 which are parallel with and separated from the central partition wall 10. Outside of the intermediate flue walls 13 are outer curved partition walls 15 terminating at their forward end in straight partition walls 16, which are parallel with and separated from a pair of walls 17 which inclose the fire chamber and are in effect continuations of the walls 7 of the flue chamber. Outside of the outer flue walls 15 are the curved outer walls 18 of the oven, which arrangement of flue walls provides a series of curved flue passages the intake openings for the passages being in staggered relation so as to provide a devious path of travel for the heated air and products of combustion from the fire chamber. For the purpose of convenience the several flue passages may be designated as the inner flue passage 19, the first intermediate flue passage 20, the second intermediate flue passage 21, and the outer flue passage 22. The outer flue passage terminates in a vertical flue 23 which connects with the upper flues which are best shown in Fig. 4. The upper flues are of similar formation to the lower flues and consist of outer flue passages 24, intermediate flue passages 25 and 26, and inner flue passages 27, the several passages being separated one from the other by means of concentric outer intermediate and inner curved walls 28, 29 and 30 respectively. The upper flues on opposite sides of the oven are separated by means of a central partition wall 31 which extends from front to rear of the furnace, and is provided at its center with a rounded supporting post or column 32 through which passes a rotary shaft for the baking plane. The upper flues, like the lower, are surrounded and inclosed by the outer closed walls 18 of the oven. The inner curved flue passages 27 terminate in forwardly extending straight passages 33 which connect with vertically extending passages 33ª connecting with the discharge flue 34 which connects with the chimney for the oven. The lower flues are provided with forwardly extending inner clean-out passages 35 and outer clean-out passages 36, the lower flues being provided at their rear ends with inner clean-out passages 37 and outer clean-out passages 38, which arrangement allows the various passages to be cleaned for the purpose of removing soot or products of combustion. The upper flue passages are likewise provided with forwardly extending inner clean-out passages 39 and outer passages 40, which passages are supplemented by inner clean-out passages 41 and outer clean-out passages 42 at the rear end of the furnace. Leading from the outlet end of the intermediate lower flue passages 21 are vertical passages 43 opening into the centrally located cylindrical baking chamber 44, and the passages 43 are adapted to be closed by means of slide dampers 45, which arrangement allows of a draft or circulation of heated air directly through the baking chamber if so desired. An outlet flue 46 leads from the forward side of the circular baking chamber and connects with the discharge flue 34, and said passage 46 can be opened and closed by means of a slide damper 47, which arrangement allows all of the products of combustion to pass either through the devious passage of the upper flues or directly through the baking chamber so that the heating of the oven can be regulated as desired.

Access is had to the interior of the fire chamber through an opening 48 in the front of the furnace, and access is had to the interior of the baking chamber through an opening 49 in the rear wall of the baking chamber. The various clean-out passages may be closed by means of doors 50 of any suitable character, and likewise the opening 48 may be closed by means of a door 51.

It will be seen from the foregoing description that the flue arrangement is one which provides a circuitous track both above and below the baking chamber, the products of combustion passing back and forth through the lower curved flue passages and then though the upper curved flue passages prior to their discharge into the chimney. At the same time it is possible to cut off the draft through the upper flue passages either entirely or partially and direct heated air and products of combustion through the baking chamber directly.

Within the baking chamber is located the rotary baking plane which consists of segmental shaped plates 52 of soapstone or similar substance, mounted upon arms 53 which radiate from a rotary shaft 54 extending vertically through the center of the baking chamber. The inner ends of the radiating arms are supported upon a lower supporting hub 55 which is formed of two sections 56 bolted together, and consists of a central sleeve 57 which is rigidly secured to the shaft by means of set screws or other attaching means and has radiating therefrom arms 58 which support a circular disk 59 having on its upper surface a plurality of radiating spacing ribs 60. The arms 53 are tapered at their inner ends 54 and the inner ends of the arms are entered between the spacing ribs, allowing the arms to lie flat upon the upper face of the disk 59, as best shown in Fig. 10. Above the supporting hub is a supporting spider 61 which is likewise formed of two sections 62 bolted or otherwise secured together, and consists of a central hub 63 having an upper circular flange 64 and a lower circular flange 65. The lower flange on its under face is slightly beveled upwardly from the center and is spaced from the lower supporting head a sufficient distance to allow for a very slight movement of the inner ends of the radiating arms, as shown in Fig. 9. The supporting spider is provided with a circular rim 66 having at suitable intervals notches 67 which are adapted to receive the hooked ends 68 of hangers 69, which hangers are equal in number to the radiating arms. Each hanger is secured at its lower end to a rib 70 on the upper side of one of the radiating arms and the hangers are provided with turnbuckles 71 for regulating the length of the hangers and the vertical elevation of the arms supported thereby. The ribs 70 connect with transversely extending vertical abutments 72, which abutments are surrounded by a metal ring 73 which serves to prevent the displacement of the arms and holds the tapered inner ends of the arms rigidly in place between the spacing blocks. The radiating arms are connected by means of inner intermediate and outer cross arms 74, 75 and 76 respectively, the ends 77 of which are outwardly beveled or flared and are fitted into sockets 78 on the upper edges of the radiating arms, and the sockets are inwardly flared or beveled so that when the ends of the arms are dropped in place within the sockets dove-tailed joints will be provided and the cross arms will serve to lock the entire structure together into a rigid and integral whole. This method of forming the baking plane enables the parts to be readily assembled and when fitted together the structure will be supported firmly and rigidly at all points. The radiating arms are provided on their upper faces with longitudinally extending flanges 79 and end cross flanges 80 which enable the segmental shaped sections of soapstone to be positioned upon the arms and held at all points against displacement.

The lower end of the shaft 54 is provided with a cone bearing 81 of hardened steel, which bearing is encircled and held in place by a collar 82, and the bearing as a whole is mounted within a casing 83 located within the well 12 in the center of the baking chamber, which casing 83 is provided in its center with a concave step 84 adapted to receive the point of the cone bearing 81 when the shaft is lowered. The shaft passes through a crown casting 85, best shown in Fig. 9, which crown casting is located in the center of the roof of the baking chamber and consists of an inner sleeve 86 and an outer circular wall 87, leaving an annular steam chamber 88 between the two walls into which steam may be admitted through a pipe 89 which extends up through the top of the oven. The steam is discharged into the baking chamber through a plurality of openings 90; and, in order to prevent the admission of dust or dirt to the interior of the oven, an outer sleeve 91 is provided which surrounds the rotary shaft and extends upwardly a considerable distance above the top of the oven.

The rotary shaft is hung from a bearing 92 suitably supported above the oven, and said bearing consists of a casing 93 having an outer wall 94 and an inner wall 95 forming an annular oil cup 96, the bottom 97 of which is dished and serves as a socket for a leveling washer 98 which is rounded on its lower face to conform with the curvature of the dished bottom of the annular oil chamber. Above the leveling washer is a lower bearing ring 99 of hardened steel which serves as a trackway for a series of balls 100 and rollers 101, the balls and rollers being mounted in two sets, an upper set and a lower set, separated by means of a ring plate 102. An upper bearing 103 is located upon and movable with the upper set of balls and rollers and projects slightly above the walls of the annular oil cup and serves as a support for a plate 104 having a hub 105 which is rigidly mounted on the shaft and is held in place by means of a set screw 106. The shaft is provided with a series of holes 107 arranged in staggered relation around the outer face of the shaft into any one of which the set screw is adapted to be entered for regulating the vertical position of the shaft.

In use fire is kindled in the grate and a draft is created through the lower flues and thence to the upper flues and through the chimney, causing the products of combustion to pass back and forth through the lower flues 19, 20, 21 and 22, and thence through the vertical passages 23 to the upper set of flues passing successively through the flues 24, 25, 26 and 27, from which latter flues the products of combustion are carried through the passages 33 and 33ª and discharged into the chimney. The progress of the products of combustion back and forth through the flues serves to heat the floor and roof of the baking chamber very quickly preparatory to the baking operation. When it is desired to obtain a more direct draft the dampers 45 controlling communication between the lower flues and the baking chamber are opened and the damper 47 controlling the draft from the baking chamber to the chimney is likewise opened, thereby establishing a direct draft through the baking chamber which serves to divert the progress of the heated air from the upper flues to the baking chamber which serves to heat the baking chamber from within as well as from without when so desired.

By providing adjustable hangers, one for each of the radiating arms, it is possible to regulate the arms to compensate for any warping or buckling due to heat so that if one or more of the arms become slightly bent from any cause the turnbuckles regulating the arm can be adjusted to level the arm and restore the baking plane to proper condition. By adjusting the turnbuckle to shorten the hanger the outer end of the arm will be raised, the inner end of the arm resting meanwhile upon the supporting hub. If it is necessary to lower the arm the same can be done by adjusting the turnbuckle to lengthen the hanger, which will force down the outer end of the arm, the inner end being slightly raised from contact with the supporting hub, which adjustment is possible by reason of the fact that a slight space is provided between the arms and the beveled flange 65 on the supporting spider. The metallic ring 73 which encircles the abutment 72 on all of the arms serves to hold the arms against longitudinal displacement, and the cross arms connecting the radiating arms in combination with the spacing ribs 60 serve to hold the arms properly spaced with respect to one another. It will thus be seen that the baking plane will be bound firmly together into an integral whole which will present a level and uniform surface at all points.

By suspending the shaft from above and likewise providing a step at the lower end it is possible to drop the shaft onto the lower bearing in case the upper bearing becomes impaired and at the same time the lower bearing is so constructed that the lower end of the shaft will be held against lateral displacement and permitted to rotate without any appreciable vibration or friction.

What I regard as new and desire to secure by Letters Patent is:

1. In a rotary bake oven having a baking chamber, a rotatable vertical shaft passing through the axial center of the baking chamber, a series of radiating arms for the baking plane, a central sleeve attached to the shaft, a series of spider arms radiating from the sleeve, a flat faced disk carried by the sleeve arms, a plurality of spacing ribs on the upper side of the disk, the ribs receiving the inner ends of the baking plane arms in the spaces between the ribs, and loosely connecting each arm to the shaft at its inner end, for the arms to rotate with the shaft and be retained at their inner ends in operative relation, a hub fixedly attached to the shaft above the baking plane arms, a plurality of spider arms radiating from the hub, a circular plate on the outer end of the spider arms and having a plurality of notches, one notch for each radial arm of the baking plane, adjustable vertical members, one for each radial arm of the baking plane and between the arm and the notched plate and engaging the notches of the plate, for independently raising and lowering each arm from its inner connected end, and properly positioning the individual arms with respect to each other, and a covering connected with the radial arms of the baking plane, substantially as described.

2. In a rotary bake oven having a baking chamber, a rotatable vertical shaft passing through the axial center of the baking chamber, a series of radiating arms for the baking plane, a central sleeve attached to the shaft, a series of spider arms radiating from the sleeve, a flat faced disk carried by the sleeve arm, a plurality of spacing ribs on the upper side of the disk, the ribs receiving the inner ends of the baking plane arms in the spaces between the ribs, and loosely connecting each arm to the shaft at its inner end, for the arms to rotate with the shaft and be retained at their inner ends in operative relation, a hub fixedly attached to the shaft above the baking plane arms, a plurality of spider arms radiating from the hub, a circular plate on the outer end of the spider arms and having a plurality of notches, one notch for each radial arm of the baking plane, adjustable vertical members, one for each radial arm of the baking plane and between the arm and the notched plate and engaging the notches of the plate, for independently raising and lowering each arm from its inner connected end, and properly positioning the individual arms with respect to each other, a covering connected with the radial arms of the baking plane, and cross arms connecting the radial arms of the baking plane and adapted to hold the arms in proper position in sidewise relation one to the other, substantially as described.

3. In a rotary bake oven having a baking chamber, a rotatable vertical shaft passing through the axial center of the baking chamber, a series of radiating arms for the baking plane, a central sleeve attached to the shaft, a series of spider arms radiating from the sleeve, a flat faced disk carried by the sleeve arms, a plurality of spacing ribs on the upper side of the disk and receiving the inner ends of the baking plane arms in the spaces between the ribs and loosely connecting each arm to the shaft at its inner end, for the arms to rotate with the shaft and be retained at their inner ends in operative relation, a hub fixedly attached to the shaft above the baking plane arms, a plurality of spider arms radiating from the hub, a circular plate on the outer ends of the spider arms and having a plurality of notches, one notch for each radial arm of the baking plane, a two-part connecting rod of turn-buckle formation for each radial arm of the baking plane and between the arm and the notched plate and engaging a notch of the plate, for independently raising and lowering each arm from its inner connected end, and properly positioning the individual arms with respect to each other, and a covering connected with the radial arms of the baking plane, substantially as described.

4. In a rotary bake oven having a baking chamber, a rotatable shaft extending vertically through the axial center of the chamber, a supporting hub fixedly secured to the shaft, a supporting spider fixedly secured to the shaft above the hub, a plurality of radiating arms having their inner ends entered between the hub and spider and loosely resting upon the hub, and adjustable hangers depending from the spider, one hanger for each arm and secured to its arm for independently raising and lowering the arm, substantially as described.

5. In a rotary bake oven having a baking chamber, a rotatable shaft extending vertically through the axial center of the chamber, a supporting hub fixedly secured to the shaft, a supporting spider fixedly secured to the shaft above the hub, a plurality of radiating arms having their inner ends entered between the hub and spider and loosely resting upon the hub, adjustable hangers depending from the spider, one hanger for each arm and secured to its arm for independently raising and lowering the arm, an abutment on each arm, and a ring common to and encircling all of the abutments for holding the arms against displacement, substantially as described.

6. In a rotary bake oven having a baking chamber, a rotatable shaft extending vertically through the axial center of the chamber, a supporting hub fixedly secured to the shaft, a supporting spider fixedly secured to the shaft above the hub, a plurality of radiating arms having their inner ends entered between the hub and spider and loosely resting upon the hub, adjustable hangers depending from the spider, one hanger for each arm and secured to its arm for independently raising and lowering the arm, an abutment on each arm, a ring common to and encircling all of the abutments for holding the arms against displacement, and cross arms extending between the radiating arms and adapted to sidewise lock the arms together, substantially as described.

7. In a rotary bake oven, having a baking chamber, a rotatable vertical shaft extending through the axial center of the baking chamber, a supporting hub fixedly secured to and rotatable with the shaft, radiating arms having their inner ends loosely resting upon the supporting hub, and held against side movement, a supporting spider fixedly secured to the shaft and horizontally extending above the arms and of larger diameter than the supporting hub, and adjustable hangers depending vertically from the periphery of the spider, one hanger for each arm and secured to the arm at a point beyond the periphery of the supporting hub for individually raising and lowering the arms and retaining the inner ends of the arms in operative relation, substantially as described.

8. In a rotary bake oven having a baking chamber, a rotatable vertical shaft extending through the axial center of the baking chamber, a supporting hub fixedly secured to and rotatable with the shaft, radiating arms having their inner ends loosely resting upon the supporting hub and held against side movement, a supporting spider fixedly secured to the shaft and horizontally extending above the arms and of larger diameter than the supporting hub, adjustable hangers depending vertically from the periphery of the spider, one hanger for each arm and secured to the arm at a point beyond the periphery of the supporting hub for individually raising and lowering the arm and retaining the inner ends of the arms in operative relation, sockets on the arms, and cross arms fitted into the sockets for connecting and rigidly securing together the radiating arms, substantially as described.

9. In a rotary bake oven having a baking chamber, a rotatable vertical shaft extending through the axial center of the baking chamber, a supporting hub fixedly secured to and rotatable with the shaft, radiating arms having their inner ends loosely resting upon the supporting hub and held against side movement, a supporting spider fixedly attached to the shaft and horizontally extending above the arms and of larger diameter than the supporting hub, adjustable hangers vertically depending from the periphery of the spider, one hanger for each arm and secured to the arm at a point beyond the periphery of the supporting hub for individually raising and lowering the arms and retaining the inner ends of the arms in operative relation, sockets on the arms, cross arms fitted into the sockets for connecting and rigidly securing together the radiating arms, abutments on the arms, and a ring or band common to and encircling all of the abutments, substantially as described.

10. In a rotary bake oven having a baking chamber, a rotatable vertical shaft passing through the axial center of the baking chamber, a supporting hub fixedly secured to the shaft, a supporting spider of larger diameter than the hub fixedly secured to the shaft above and in co-relation to the hub, a series of radially arranged spacing ribs on the upper face of the hub, radiating arms having their inner ends entered between the hub and spider and loosely inserted between the spacing ribs, adjustable hangers depending from the periphery of the supporting spider, one hanger for each arm and secured to the arm at a point beyond the periphery of the hub, sockets on the radiating arms, cross arms provided with notched ends adapted to be entered and held within the sockets for rigidly holding the arms properly positioned sidewise, and a sectional covering for the baking plane consisting of segmental shaped blocks of material supported by the radiating arms and cross arms, substantially as described.

FREDERICK R. BARNHEISEL.

Witnesses:
OSCAR W. BOND,
WALKER BANNING.